United States Patent
Hayee et al.

(10) Patent No.: US 10,567,910 B2
(45) Date of Patent: Feb. 18, 2020

(54) WORKZONE SAFETY SYSTEM

(71) Applicant: Regents of the University of Minnesota, Minneapolis, MN (US)

(72) Inventors: M. Imran Hayee, Duluth, MN (US); Nazanin Abbaszadeh Banaeiyan, Duluth, MN (US); Attiq Uz Zaman, Duluth, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 166 days.

(21) Appl. No.: 15/340,509

(22) Filed: Nov. 1, 2016

(65) Prior Publication Data

US 2017/0127237 A1 May 4, 2017

Related U.S. Application Data

(60) Provisional application No. 62/249,637, filed on Nov. 2, 2015.

(51) Int. Cl.
*G01S 19/13* (2010.01)
*H04W 4/02* (2018.01)
(Continued)

(52) U.S. Cl.
CPC ............ *H04W 4/023* (2013.01); *E01F 9/662* (2016.02); *G01S 5/0027* (2013.01); *G01S 19/13* (2013.01); *G01S 19/17* (2013.01); *G01S 19/51* (2013.01); *G06F 3/04817* (2013.01); *H04W 4/40* (2018.02); *H04W 4/90* (2018.02); *H04B 1/385* (2013.01)

(58) Field of Classification Search
CPC ........ G01S 5/0027; G01S 19/13; G01S 19/51; H04W 4/023; H04W 4/90; H04W 4/046; E01F 9/662; H04B 1/385
See application file for complete search history.

(56) References Cited

U.S. PATENT DOCUMENTS 6,061,628 A   5/2000 Hayashi et al.
6,587,755 B1  7/2003 Smith et al.
(Continued)

FOREIGN PATENT DOCUMENTS

CA    2794990 A1    6/2013
CN   102625239 A    8/2012

OTHER PUBLICATIONS

Ceccarelli et al., Design and Implementation of Real-Time Wearable Devices for a Safety-Critical Track Warning System, 2012, IEEE, p. 147-154 (Year: 2012).*
(Continued)

*Primary Examiner* — McDieunel Marc
(74) *Attorney, Agent, or Firm* — Theodore M. Magee; Westman, Champlin & Koehler, P.A.

(57) ABSTRACT

An apparatus includes a wireless communication system capable of receiving position information for a plurality of workers in a work zone and a position system capable of providing position information for a piece of movable equipment in the work zone. A processor is capable of receiving the position information for the plurality of workers and the position information for the movable equipment and is capable of determining the position of the workers relative to the position of the movable equipment.

17 Claims, 5 Drawing Sheets

(51) Int. Cl.
*H04W 4/40* (2018.01)
*G06F 3/0481* (2013.01)
*E01F 9/662* (2016.01)
*G01S 5/00* (2006.01)
*H04W 4/90* (2018.01)
*G01S 19/51* (2010.01)
*G01S 19/17* (2010.01)
*H04B 1/3827* (2015.01)

(56) References Cited

U.S. PATENT DOCUMENTS

| | | | |
|---|---|---|---|
| 7,859,428 B2 | 12/2010 | Boss et al. | |
| 8,520,695 B1 | 8/2013 | Rubin et al. | |
| 2002/0008637 A1 | 1/2002 | Lemelson et al. | |
| 2005/0107934 A1* | 5/2005 | Gudat | G01S 5/0072 701/50 |
| 2007/0032245 A1 | 2/2007 | Alapuranen | |
| 2007/0185748 A1* | 8/2007 | Anderson | G06Q 10/06 340/5.61 |
| 2009/0140882 A1* | 6/2009 | Arenburg | G08G 1/096741 340/936 |
| 2009/0234859 A1 | 9/2009 | Grigsby et al. | |
| 2010/0188265 A1 | 7/2010 | Hill et al. | |
| 2011/0199231 A1 | 8/2011 | Loiselle et al. | |
| 2014/0104081 A1* | 4/2014 | Cross | G08G 9/00 340/989 |
| 2015/0199902 A1 | 7/2015 | Hayee et al. | |
| 2015/0199905 A1 | 7/2015 | Hayee et al. | |
| 2016/0012194 A1* | 1/2016 | Prakash | G06Q 30/0601 705/2 |
| 2017/0372431 A1* | 12/2017 | Perl | G06Q 20/10 |
| 2018/0014771 A1* | 1/2018 | Merchant-Borna | A61B 5/4064 |

OTHER PUBLICATIONS

Banerjee et al., A review of workspace challenges and wearable solutions in railroads and construction, 2017, IEEE, p. 91-96 (Year: 2017).*
Forsyth et al., Feasibility of GPS-based warning system for roadside workers, 2014, IEEE, p. 1045-1051 (Year: 2014).*
Vallozzi et al., Wearable textile GPS antenna for integration in protective garments, 2010, IEEE, p. 1-4 (Year: 2010).*
Boronowsky et al., Changing the working environment of mobile workers by wearable computing, 2007, IEEE, p. 1-8 (Year: 2007).*
Figueiras, Multi-hypothesis GPS and Electronic Fence Data Fusion for Safety-Critical Positioning in Railway Worksites, 2013, IEEE, p. 31-39 (Year: 2013).*
Ali et al., Design and analysis of a wearable antenna system for wireless safety applications, 2015, IEEE, p. 1-4 (Year: 2015).*
Kinugawa et al., PaDY: Human-friendly/Cooperative Working Support Robot for Production Site, 2010, IEEE, p. 5472-5479 (Year: 2010).*
Abdel-Aty, Comprehensive analysis of the relationship between real-time traffic surveillance data and rear-end crashes on freeways, Transportation Research Record, Journal of the Transportation of Research Board, No. 1953, pp. 31-40, 2006.
ADDCO, www.addco.com/en/products/traffic/portables/als/, 4 pages, accessed Jan. 7, 2015.
Alazawi et al., Intelligent disaster management system based on cloud-enabled vehicular networks, 11th International Conference on Its Telecommunications, pp. 361-368, 2011.
Bai et al., Reliability Analysis of DSRC Wireless Communication for Vehicle Safety Applications, Proceedings of the IEEE ITSC, IEEE Intelligent Transportation Systems Conference Toronto, Canada, pp. 355-362, Sep. 17-20, 2006.
Bowman, An Innovative Intelligent Awareness System for Roadway Workers Using Dedicated Short-Range Communications, Report prepared for the Research and Innovative Technology Administration (RITA), U.S. Department of Transportation, submitted by Virginia Tech Transportation Institute, Blacksburg, VA, 21 pages, Jan. 31, 2015.
Buscher et al., Intelligent mobility systems: some socio-technical challenges and opportunities, Communications Infrastructure: Systems and Applications in Europe, R. Mehmood, E. Cerqueira, R. Piesiewicz, and I. Chlamtac, Eds., pp. 140-152, 2009.
Bushman, Effect of Intelligent Transportation Systems in Work Zones: Evaluation of North Carolina Smart Work Zones, B7 North Carolina Department of Transportation, NC. 2004, 107 pages.
Calabrese et al., Real-Time Urban Monitoring Using Cell Phones: A Case Study in Rome, IEEE Transactions on Intelligent Transportation Systems, vol. 12, No. 1, 2011, pp. 141-151.
http://www.caltrans.ca.gov/newtech/researchreports/reports/2009/portable_atis_con_ops_final_report.pdf.
Cheng et al., A fully mobile, GPS enabled, vehicle-to-vehicle measurement platform for characterization of the 5.9 GHz DSRC channel, Antennas and Propagation Society International Symposium, 2007, IEEE, pp. 2005-2008.
Cheng et al.,A Roadside Scattering Model for the Vehicle-to-Vehicle Communication Channel, IEEE Journal on Selected Areas in Communication, vol. 31, No. 9, 2013, pp. 449-459.
Chu et al., Evaluation of effectiveness of automated work zone information systems, Transportation Research Record: Journal of Transportation Research Board, No. 1911, Transportation Research Board of the National Academies, Washington, D.C., 2005, pp. 73-81, Dec. 2009.
Coifman et al., Vehicle Reidentification and Travel Time Measurement on Congested Freeways, Transportation Research Part A: Policy and Practice, vol. 36A, No. 10, 2002, 50 pp. 899-917.
Cowan, Useful headway models, Transportation Research, vol. 9, Issue 6, Dec. 1975, pp. 371-375.
Minnesota Department of Transportation. Internet. 2012 CMS Manual of Practice. Oct. 2012. (Accessed Jul. 11, 2015), http://dotapp7.dot.state.mn.us/edms/download?docId=1244587.
DSRC Committee of the Society of Automotive Engineers (SAE), "Dedicated short range message set (DSRC) dictionary," SAE, Warrendale, Pa, Tech. Rep. Std. J2735, 2009.
Fambro et al., A new stopping sight distance model for use in highway geometric design, In Transportation Research Board of the National Academies, Transportation research circular E-0003: Washington, DC, 1998, pp. 33-1-33-11.
Fang, Portable Intelligent Traffic Management System for Work Zones and Incident Management Systems: Best Practice Review, Proceedings of the 11th International IEEE Conference on Intelligent Transportation Systems, ITSC 2008., pp. 563-568, Oct. 12-15, 2008.
Faouzi et al., Motorway Travel Time Prediction Based on Toll Data and Weather Effect Integration, IET Intelligent Transport Systems, vol. 4, No. 4, 2010, pp. 338- 345.
Farah et al., Evaluation of the effect of cooperative infrastructure-to-vehicle systems on driver behavior, Transportation Research Part C: Emerging Technologies, vol. 21, Issue 1, Apr. 2012, pp. 42-56.
Farrell., Differential GPS Reference Station Algorithm-design and Analysis, IEEE Transactions on Control Systems Technology, vol. 8, No. 3, May 2000, pp. 519-531.
Fontaine, Guidelines for Application of Portable Work Zone Intelligent Transportation Systems, Transportation Research Record: Journal of Transportation Research Board, No. 1824, Transportation Research Board of the National Academies, Washington, D.C., 2003, pp. 15-22, Mar. 2010.
Gartner, Revised Monograph on Traffic Flow Theory, Unsignalized Intersection Theory, In Transportation Research Record: Journal of Transportation Research Board, Transportation Research Board of the National Academies, Washington, D.C., 2005, pp. 8-1-8-47.
Gates et al., Analysis of Driver Behavior in Dilemma Zones at Signalized Intersections, In Transportation Research Record: Journal of the Transportation Research Board, No. 2030, Transportation Research Board of the National Academies, Washington D.C., 2007, pp. 29-39.
Geronimo et al., Survey of Pedestrian Detection for Advanced Driver Assistance Systems, IEEE Transactions on Pattern Analysis and Machine Intelligence, vol. 32, No. 7, 2010, pp. 1239-1258.

(56) References Cited

OTHER PUBLICATIONS

Gressmann et al., Surround view pedestrian detection using heterogeneous classifier cascades, 14th International IEEE Conference on Intelligent Transportation Systems, Oct. 5-7, 2011.
Haseman et al., Real-Time Measurement of Travel Time Delay in Work Zones and Evaluation Metrics Using Bluetooth Probe Tracking, In Transportation Research Record: Journal of the Transportation Research Board, No. 2169, Transportation Research Board of the National Academies, Washington, D.C., 2010, pp. 40-53.
Hassan et al., Effect of vertical alignment on driver perception of horizontal curves, Journal of Transportation Engineering vol. 129, No. 4 (2003): 399-407.
Herrera et al., Evaluation of Traffic Data Obtained via GPS-enabled Mobile Phones: The Mobile Century Field Experiment, Transportation Research Part C: Emerging Technologies, vol. 18, No. 4, 2010, pp. 568-583.
Hsu et al., Verification of On-Line Vehicle Collision Avoidance Warning System using DSRC, World Academy of Science, Engineering and Technology, vol. 3, Issue 55, Jul. 2009, pp. 343-349.
Huang et al., Adaptive intervehicle communication control for cooperative safety systems, IEEE Network, vol. 24, No. 1, pp. 6-13, Jan. 2010.
Ibrahim et al., Development of a freeway queue detection and warning system using ad-hoc control and DSRC based V2V communication, Bentham Science Publishers, 2014, pp. 1-10.
Ibrahim et al., Hybrid work zone information system with portable changeable message signs and dedicated short-range communication, In Transportation Research Board: Journal of the Transportation Research Board, No. 2380, Transportation Research Board of the National Academies, Washington, D.C. 2013, pp. 29-35.
Intelligent Transportation Systems in Work Zones: A Cross-Cutting Study. Integrated Work Zone Systems for Improving Travel Conditions and Safety. No. FHWA-OP-02-025. FHWA, Washington, D.C., 2002, 56 pages.
Intelligent Transportation Systems in Work Zones: A Case Study (Dynamic Lane Merge System). Report No. FHWA-HOP-04-033. U.S. Department of Transportation, Washington, DC 2004, 15 pages.
Jia et al., An Evaluation of Alternative Technologies to Estimate Travel Time on Rural Interstates, In Transportation Research Board 92nd Annual Meeting. No. 13-3892, Washington D.C. 2013, 18 pages.
Jiang et al., Design of 5.9 GHz DSRC-based Vehicular Safety Communication, IEEE Wireless Communications magazine, vol. 13 No. 5, pp. 36-43, Oct. 2006.
Kandarpa et al., Final Report: Vehicle Infrastructure Integration Proof of Concept (POC) Test—Executive Summary. Booz Allen Hamilton, McLean, VA. Feb. 2009, 24 pages.
Karsky, Comparing Four Methods of Correcting GPS Data: DGPS, WAAS, L-Band, and Post-processing, Report, Tech Tip 0471-2307-MTDC, U.S. Department of Agriculture, Forest Service, Missoula Technology and Development Center. Missoula, MT, Jul. 2004.
Kashif et al., Wireless Communication Technologies for ITS Applications, Topics in Automotive Networking, Communications Magazine, IEEE 48, No. 5, 2010, pp. 156-162.
Kwong et al., Arterial Travel Time Estimation Based on Vehicle Re-identification Using Wireless Magnetic Sensors, Transportation Research Part C: Emerging Technologies, vol. 17, No. 6, 2009, pp. 586-606.
Lajunen et al., Does traffic congestion increase driver aggression? In Transportation Research Part F: Traffic Psychology and Behavior, vol. 2, Issue 4, pp. 225-236, Dec. 1999.
Layton et al., Stopping Sight Distance, Kiewit Center for Infrastructure and Transportation, Oregon Department of Transportation, Apr. 2012, 28 pages.
Lee et al., Automated Work Zone Information System (AWIS) on Urban Freeway Rehabilitation: California Implementation, Transportation Research Board (TRB), No. 1948, Transportation Research Board of the National Academies, Washington, D.C., 2006, pp. 77-85.
Liu et al., Performance evaluation of intersection warning system using a vehicle traffic and wireless simulator, Proceedings of IEEE Intelligent Vehicles Symposium, vol. B37 pp. 171-176, Jun. 6-8, 2005.
Luttrell, Comparative Analysis Report: The Benefits of Using Intelligent Transportation Systems in Work Zones, FHWA-HOP-09-002.Washington, DC 2008: Federal Highway Administration, 122 pages.
Maitipe et al., Development and field demonstration of DSRC-based V2I work zone traffic information system with V2V assistance, Transportation Research Board's 91th Annual Meeting, Jan. 23-27, Washington, D.C. 2012, 14 pages.
Maitipe et al., Development and field demonstration of DSRC based V2V-assisted V2I traffic information system for the work zone, Jun. 2012, Intelligent Transportation Systems Institute Center for Transportation Studies University of Minnesota, 50 pages.
Maitipe et al., Vehicle-to-Infastructure Traffic Information System for the Work Zone Based on Dedicated Short-Range Communication, Transportation Research Record, Journal of Transportation Research Board, No. 2243, pp. 67-73, 2011.
Maitipe et al., Development and Field 1 Demonstration of DSRC-Based V2I Traffic Information System for the Work Zone, Transportation Research Record: Journal of Transportation Research Board, Transportation Research Board of the National Academies, Washington, D.C., 2011, 46 pages.
Manual on Uniform traffic control devices for streets and highways. Federal Highway Administration, U.S. Department of Transportation, Washington D.C., pp. 2A-2 to 2A-3 and 6F-25 and 6F-26, 2003.
Marfia et al., Vehicular congestion modeling and estimation for advanced traveler information systems, Proceedings of the International Federation for Information Processing Wireless Days WD-IFIP, Oct. 2010, pp. 1-5, 20-22.
Matosevic et al., Comparison of Accuracy using GPS and low-cost DGPS, IEEE Transactions on Instrumentation and Measurement, vol. 55, No. 5, Oct. 2006, pp. 1677-1683.
Misener et al., PATH Investigations in Vehicle-Roadside Cooperation and Safety: A Foundation for Safety and Vehicle-Infrastructure Integration Research, Proceedings of Intelligent Transportation Systems Conference (ITSC) '06, IEEE, 2006, pp. 9-16.
Morgan, Managing DSRC and WAVE standards Operations in a V2V Scenario, International Journal of Vehicular Technology, vol. 2010, 18 pages.
Nowakowski et al., A SafeTrip 21 Initiative: Networked Traveler Foresighted Driving Field Experiment Final Report. Technical Report, UCB-ITS-PRR-2011-05. California Partners for Advanced Transit and Highways, University of California, Berkeley, 2011, 124 pages.
Nowakowski et al., Evaluation of Real-Time Freeway End-of-Queue Alerting System to Promote Driver Situational Awareness, Transportation Research Record: Journal of Transportation Research Board, No. 2324, Transportation Research Board of the National Academies, Washington, D.C., 2012, pp. 37-43, Mar. 2013.
Pesti et al., Simulation Based Evaluation of Dynamic Queue Warning System Performance, Transportation Research Board 92nd Annual Meeting. No. 13-5086, Washington D.C. 2012, 16 pages.
Pollack et al., Narrative text analysis to identify technologies to prevent motor vehicle crashes: Examples from military vehicles, Journal of Safety Research, No. 44, Feb. 2013, pp. 45-49.
Qian et al., A Secure VANET Mac Protocol for DSRC Applications, Proceedings of IEEE Globecom, 2008, New Orleans, Nov. 2008, 7 pages.
Rahman et al., Smartphone-based Forward Collision Warning Messages in Work Zones to Enhance Safely and Reduce Emissions. Presented at 94th Transportation Research Board Annual Meeting, Washington, D.C., Jan. 11-15, 2015.
Real-Time Work Zone Traffic Control System—Using an Automated Traffic Information System to Reduce Congestion and Improve Safety During Reconstruction of the I-55 Lake Springfield Bridge in Illinois Intelligent Transportation Systems in Work Zones: A Case Study, FHWA-HOP-04-018, 2004, 20 pages.
National Work Zone Safety, Information Clearinghouse, Internet, Guidelines on Managing Speeds in Work Zones, Roadway Safety

(56) References Cited

OTHER PUBLICATIONS

Consortium (Access Jul. 2015), http://www.workzonesafety.org/files/documents/training/courses_programs/rsa_program/RSP Guidance Documents Download/RSP Speed Guidance Download.pdf.

Saleem et al., Analysis and Mitigation of Tropospheric Error Effect on GPS Positioning Using Real GPS Data, International Journal of Electronics and Electrical Engineering, vol. 2, No. 3, Sep. 2014, pp. 249-253.

Sebastien et al., Empirical IEEE 802.11 p Performance Evaluation on Test Tracks, Journal of Networks 9, No. 6, 2014, pp. 1485-1495.

Shimura et al., QoS Management Technique of Urgent Information 8 Provision in ITS Services using DSRC for Autonomous Base Stations, IEICE Transactions on Information and Systems, vol. E91D, Issue: 9, Sep. 2008, pp. 2276-2284.

Ullman et al., Development of a Field Guide for Portable Changeable Message Sign Use in Work Zones, Texas Transportation Institute, College Station, 2005, 46 pages.

van Eenennaam et al., Providing over-the-horizon awareness to driver support systems, Proceedings of 4th IEEE Workshop on Vehicle to Vehicle Communications (V2VCOM), pp. 19-25, 2008.

Varaiya, What We've Learned About Highway Congestion, Access, vol. 27, 2005, pp. 2-9.

Wegener et al., TraCI: an interface for coupling road traffic and network simulators, Proceedings of the 11th communications and networking simulation symposium (CNS '08). ACM, New York, NY, USA, 2008, 155-163.

Weng et al., Rear-end crash potential estimation in the work zone merging areas, Journal of Advanced Transportation, SN: 2042-3195, vol. 48, 2012, pp. 238-249.

U.S. Department of Transportation, Federal Highway Administration. Internet. High Accuracy-Nationwide Differential Gobal Positioning System Program Fact Sheet. FHWARD-03-39, 2003(Accessed Jul. 10, 2015), http://www.fhwa.dot.gov/publications/research/operations/03039/.

U.S. Department of Transportation, Intelligent Transportation Systems Joint Program Office. Internet. DSRC Communications Scalability Research Update, ITS-JPO Public Workshop Sep. 24, 2013 (Accessed Jun. 2016), http://www.its.dot.gov/presentations/CV_PublicMeeting2013/PDF/Day1_LukucInteroperabil ity.pdf.

U.S. Department of Transportation, National Highway Traffic Safety Administration. Internet. Vehicle Safety Communications—Applications (VSC-A), Final Report (Accessed Jun. 2016), http://www.nhtsa.gov/DOT/NHTSA/ NVS/Crash%20Avoidance/Technical%20Publications/2011/811492A.pdf.

OKI's GPS receiver with DSRC technology: http://www.oki.com/en/press/2009/01/z08113e.html, accessed 2016.

Worker Safety Data on US DoT website: http://www.ops.fhwa.dot.gov/wz/workersafety/, accessed Jul. 29, 2016.

http://www.cts.umn.edu/Publications/ResearchReports/reportdetail.html?id=2148, accessed 2015.

http://www.cts.umn.edu/Publications/ResearchReports/reportdetail.html?id=2250, accessed 2015.

Minnesota Department of Transportation. Internet. Speed Limits in Work Zones Guidelines, Oct. 2014.(Accessed Jul. 11, 2015), http://www.dot.state.mn.us/speed/pdf/WZSpeedLimitGuideline.pctf.

Xiao et al., Traffic incident detection using multiple-kernel support vector machines, Transportation Research Record: Journal of Transportation Research Board, No. 2324, Transportation Research Board of the National Academies, Washington, D.C., 2012, pp. 44-52, Mar. 2013.

Xu et al., Vehicle-to Vehicle Safety Messaging in DSRC, Proceedings of 1st ACM Workshop on Vehicular Adhoc Networks (VANET), Oct. 2004, pp. 19-28.

Zhou et al., Vehicle platoon control in High-latency wireless communications environment: Model predictive control method, Transportation Research Record: Journal of Transportation Research Board, No. 2324, Transportation Research Board of the National Academies, Washington, D.C., 2012, pp. 81-90, Mar. 2013.

I'm Here, https://www.youtube.com/watch?v=drPDE7vhTy0, accessed May 2018.

File history of U.S. Appl. No. 14/593,172 including Notice of Allowance dated Aug. 30, 2017; Examiner Initiated Interview Summary dated Aug. 30, 2017; Response dated Aug. 7, 2017, Final Rejection dated May 31, 2017, Response dated Jan. 23, 2017; Office Action dated Oct. 31, 2016.

File history of U.S. Appl. No. 14/593,179 including Notice of Allowance dated May 4, 2018; Response dated Jan. 5, 2018; Office Action dated Oct. 6, 2017; Response dated Aug. 10, 2017; Advisory Action dated Aug. 4, 2017; Supplemental Response dated Jul. 26, 2017; Advisory Action dated Jul. 24, 2017; Response dated Jun. 29, 2017; Final Rejection dated May 1, 2017; Response dated Jan. 4, 2017; Office Action dated Oct. 13, 2016.

http://trb.metapress.com/content/4885780436228757/, 2 pages (2010).

http://trid.trb.org/view.aspx?id=1247059, 2 pages (2013).

http://trid.trb.org/view.aspx?id=1241344, 2 pages (2013).

* cited by examiner

WORKZONE SAFETY SYSTEM

The present application is based on and claims the benefit of U.S. provisional patent application Ser. No. 62/249,637, filed Nov. 2, 2015, the content of which is hereby incorporated by reference in its entirety.

This invention was made with State of Minnesota support under 99008 Worker Order #150 awarded by Minnesota. The State of Minnesota has certain rights in this invention.

BACKGROUND

Each year thousands of workers are injured in road work zones in the United States. Most of these injuries occur due to workers being struck by construction vehicles or by passing traffic.

SUMMARY

An apparatus includes a wireless communication system capable of receiving position information for a plurality of workers in a work zone and a position system capable of providing position information for a piece of movable equipment in the work zone. A processor is capable of receiving the position information for the plurality of workers and the position information for the movable equipment and is capable of determining the position of the workers relative to the position of the movable equipment.

In a further embodiment, a construction vehicle includes a communication system that receives position information for a plurality of workers and a position system that determines a position of the construction vehicle. An application processor determines the location of the plurality of workers relative to the construction vehicle. A display shows the location of the plurality of workers relative to the construction vehicle.

In a still further embodiment, a system is formed of a plurality of signs distributed along a length of a road work zone. Each sign is assigned a portion of the road work zone and receives information indicating whether at least one worker is currently in the sign's respective assigned portion. Each sign displays a first speed limit when at least one worker is in the sign's respective assigned portion and a second speed limit when no workers are in the sign's respective assigned portion.

DETAILED DESCRIPTION

In the embodiments described below, wearable safety devices worn by people in a road work zone transmit position information to construction vehicles in the road work zone and to portable signs distributed along the road work zone. Each construction vehicle includes a positioning system that provides the position of the construction vehicle. Upon receiving the position information for the workers, a processor on the construction vehicle determines relative positioning between the workers and the construction vehicle. The processor then generates an image for a display to indicate the position of the workers relative to the construction vehicle. Each of the signs distributed along the road work zone is assigned a portion of the road work zone depending upon the range of the wireless communication system used. If the position information for the workers indicates that a worker is in a portion of the work zone assigned to a sign, the sign changes a speed limit it displays to a lower speed. After all of the workers have left that portion of the work zone, the sign increases the displayed speed limit. As a result, vehicles passing next to the road work zone will only be slowed in portions of the work zone that contain workers.

Figure 1:
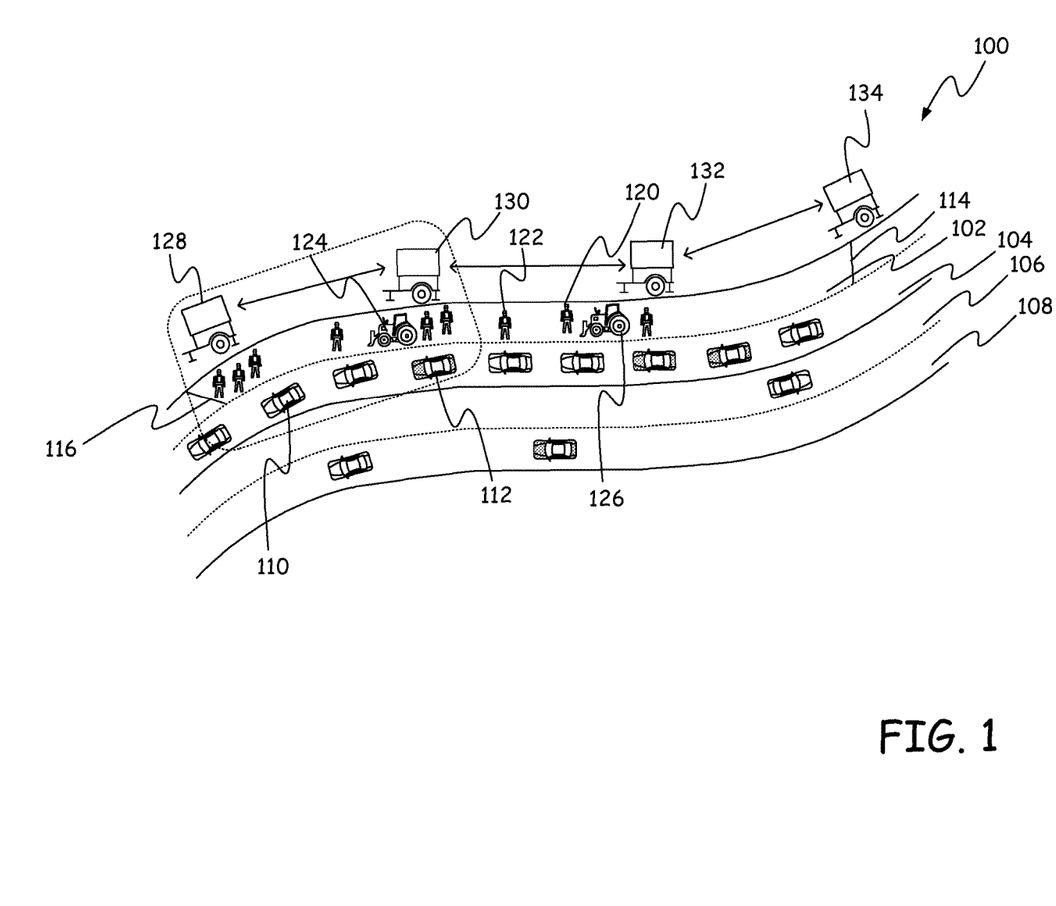
FIG. 1 is a plan view of a road work zone in accordance with some embodiments.

FIG. 1 provides a plan view of a road section 100 having a road work zone 102, a passing lane of traffic 104 and two opposing lanes of traffic 106 and 108. Vehicles, such as vehicles 110 and 112 drive past road work zone 102 in lane 104. Road work zone 102 includes a start 114 and an end 116. A plurality of workers, such as workers 120 and 122 are located within road work zone 102. In addition, pieces of moveable equipment such as construction vehicles 124 and 126 are positioned within road work zone 102. A plurality of signs, including signs 128, 130, 132 and 134 are distributed across road work zone 102 and display messages to vehicles in lane 104. Although signs 128, 130, 132 and 134 are shown to the right of the work zone, in many embodiments, the signs will be positioned within the work zone itself. As discussed further below, each of the workers wear a safety device that determines the position of the worker using a global positioning system (GPS) and transmits this position information over a wireless communication system to one or more of the construction vehicles, the signs, and the passing vehicles, such as vehicle 112. The pieces of moveable equipment include communication systems that receive the position information of the plurality of workers and further include their own global positioning system that provides the position of the piece of moveable equipment. An application processor in the piece of equipment uses the position information for the piece of equipment and the position information for the plurality of workers to construct an image showing the location of the workers relative to the piece of equipment vehicle. This image is then displayed on a monitor in the piece of moveable equipment.

Figure 2:
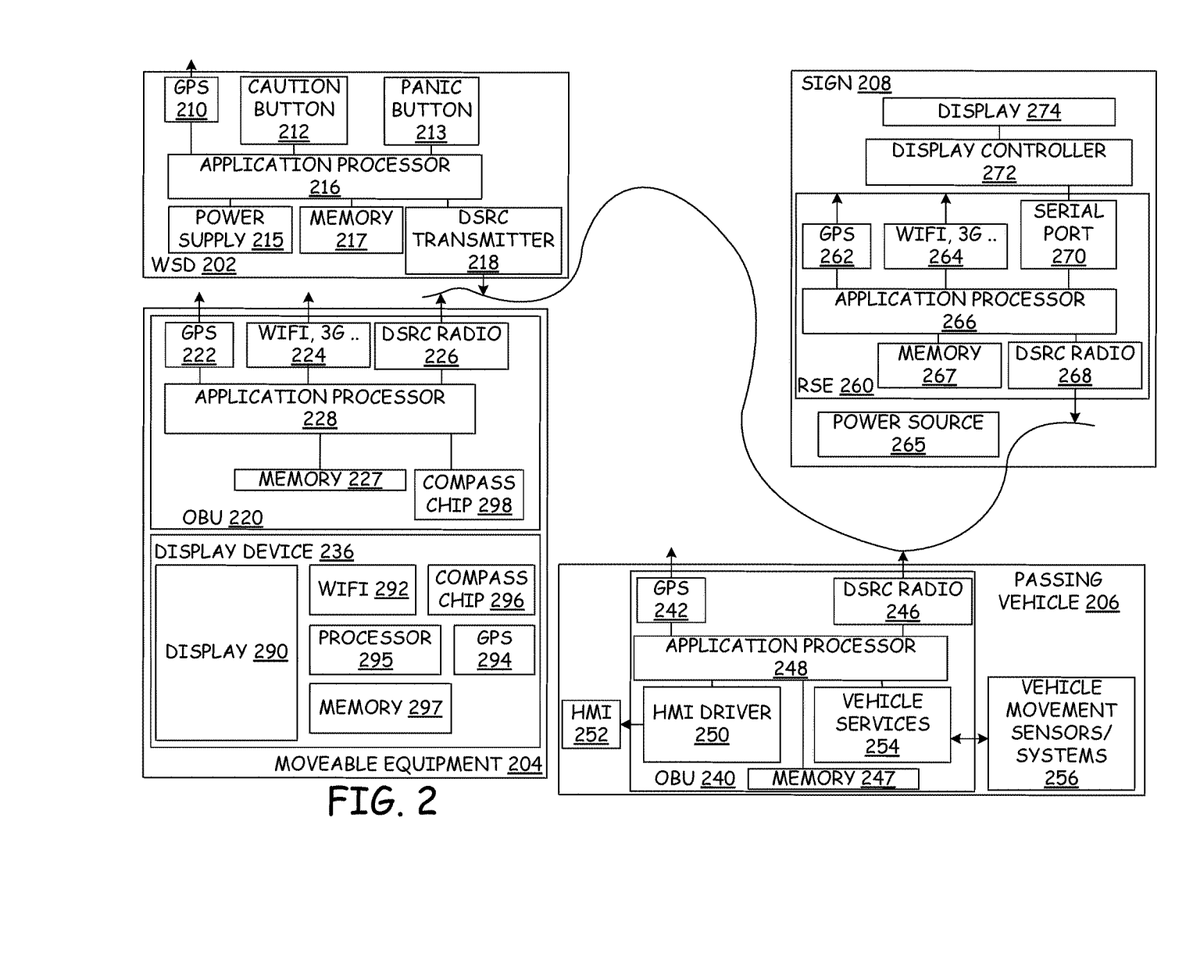
FIG. 2 is a block diagram of a system in accordance with some embodiments.

FIG. 2 provides a block diagram of a wearable safety device (WSD) 202, a piece of worksite moveable equipment 204, a passing vehicle 206, and a portable road sign (Dedicated Short-Range Communication (DSRC)-equipped Portable Changeable Message Sign (PCMS)) 208 that can be used in accordance with various embodiments.

Wearable safety device 202 is a device worn by a worker and in some embodiments is incorporated into a safety vest or helmet worn by the worker. Wearable safety device 202 includes an application processor 216 that executes one or more instructions stored in a memory 217 to communicate with vehicles and signs using a wireless communication radio or transmitter 218, which in one embodiment is a dedicated short range communication (DSRC) radio/transmitter. Wearable safety device 202 also includes a position system 210, such as a Global Positioning System, that allows wearable safety device 202 to determine its position. Wearable safety device also includes a Caution Button 212 and a Panic Button 213, which when activated by a worker causes application processor 216 to issue a Caution message and a Panic message, respectively. The Caution message indicates that the worker believes they are in a potentially dangerous position such as behind a construction vehicle. The Panic message indicates that the worker believes they are in imminent danger or have already been injured. A power supply 215, such as a rechargeable battery or solar cell/battery combination, provides power to GPS 210, application processor 216, memory 217 and transmitter 218.

Worksite moveable equipment 204, which can be any form of moveable equipment including construction vehicles, cranes, and concrete pumps, for example, includes an onboard unit 220 and a display device 236 having a display or monitor 290. Onboard unit 220 includes an application processor 228 that is able to receive position information for the position of moveable equipment 204 from a position system 222, which in FIG. 2 takes the form of a global positioning system that determines the position of onboard unit 220 based on signals provided by satellites.

Application processor 228 is also able to transmit and receive messages using a transceiver or radio 226, which in FIG. 2 takes the form of a DSRC radio. Using radio 226, onboard unit 220 is able to transmit messages indicating the position of moveable equipment 204 to other construction vehicles, passing vehicles 206 and roadside signs 208. Radio 226 is also used to receive messages from other construction vehicles, wearable safety devices and passing vehicles. Processor 228 uses instructions in a memory 227 to decode and interpret the messages, such as position information for workers, caution messages from workers, panic information from workers and position information from other construction vehicles. In accordance with one embodiment, processor 228 uses the position information for the workers, the position information for the other construction vehicles and the position information for moveable equipment 204 to determine a relative GPS position for the workers and other construction vehicles with respect to moveable equipment 204. Most of the error in the relative worker position information and other construction vehicle position information with respect to moveable equipment 204 is removed because all those GPS receivers will experience similar atmospheric error. Thus, determining the differences between the position information received for moveable equipment 204 and the position information for the workers and other construction vehicles removes the errors that are common to all of the position information, thereby producing more accurate relative GPS positions. The relative GPS positions are also normalized before visual display so that moveable equipment 204 is always in the middle of the display.

In one embodiment, processor 228 uses the positions of the workers and other construction vehicles relative to the construction vehicle to construct a user interface in the form of a graphical image that shows where the workers and other construction vehicles are positioned relative to the construction vehicle. As shown below, the graphical image also includes an indication of which workers, if any, have activated their Caution Button or Panic Button. Processor 228 provides the graphical image to display device 236 through a Wi-Fi interface 224 in onboard unit 220 and a Wi-Fi interface 292 in display device 236. Although a Wi-Fi interface is shown, those skilled in the art will recognize that other interfaces could be used to communicate between processor 228 and display device 236 such as a wired connection. Display device 236 then displays the graphical image on display 290.

In a second embodiment, display device 236 is a mobile device that contains a processor 295 and a memory 297. In such embodiments, instead of sending a graphical image, application processor 228 sends the relative position information for the workers and other construction vehicles as well as any "Caution" or "Panic" messages to processor 295 and processor 295 generates a graphical image from this information that displays the location of the workers and other construction vehicles relative to this construction vehicle. Display 290 then displays this graphical image.

Display device 236 may be permanently mounted within the construction vehicle, may be removably mounted within the construction vehicle, or may be loosely placed within the construction vehicle. Although display device 236 is described above as being positioned in a construction vehicle, such as in the cab of the construction vehicle, in other embodiments, display device 236 is positioned within a cab of other movable equipment such as cranes.

Although the positioning systems 210 and 222 are able to provide location information for the workers and vehicles, the positioning systems are not able to identify the rotational orientation of the construction vehicle relative to the workers and the vehicles. In order to generate a graphical image that properly shows the location of workers and other vehicles relative to the front of the construction vehicle containing display 290, the orientation of front of the construction vehicle must be determined.

In accordance with one embodiment, the orientation is determined by comparing the GPS position provided by GPS 222 in onboard unit 220 with the GPS position provided by GPS 294 in display device 236. This allows processor 295 to identify the orientation of a line between onboard unit 220 and display device 236. Using the known and fixed angle between this line and a line from the back to the front of the construction vehicle, it is possible to identify the orientation of the line from the back to the front of the vehicle. The amount of error in the orientation determined in this manner is a function of the distance between onboard unit 220 and display device 236. The greater the distance between the two, the less error there is in the determined orientation. For some vehicles, it is not possible to position onboard unit 220 far enough away from display device 236 to provide an accurate enough orientation value.

In accordance with a second embodiment, the orientation of the construction vehicle is determined using a compass chip 296 installed in display device 236. Compass chip 296 uses gradiometers and accelerometers to detect changes in the magnetic field, the earths incline and the pull of gravity to identify an orientation for display device 236.

In embodiments where compass chip 296 in display device 236 is not accurate enough, a highly accurate compass chip 298 is included in onboard unit 220 and provides an orientation value to application processor 228 that is transmitted to display device 236 together with the relative positions of the workers, other construction vehicles and passing vehicles. Processor 295 then generates the graphical image to accurately portray the position of the workers, other construction vehicles and passing vehicles relative to the front of moveable equipment 204.

Passing Vehicle 206 includes an onboard unit 240, a vehicle movement sensors/system 256 and a human-machine interface 252. Onboard unit 240 includes an application processor 248, which executes instructions stored in memory 247 to perform the functions described below. Vehicle movement sensors/system 256 provides information about the vehicle such as the current speed of the vehicle, the status of various vehicle components such as tires, lights, brakes, wipers, and the orientation of the tires, for example. This information is provided to a vehicle services module 254 in onboard unit 240, which provides the information to application processor 248. Application processor 248 also receives position information from a position system 242, which in FIG. 2 takes the form of a global positioning system that determines the position of onboard unit 240 based on signals provided by satellites.

Application processor 248 is also able to transmit and receive messages using a transceiver or radio 246, which in FIG. 2 takes the form of a DSRC radio. Using radio 246, onboard unit 240 can transmit the position of vehicle 206 to signs 208 and to moveable equipment 204. Onboard unit 240 is also able to receive messages from other passing vehicles, construction vehicles, and wearable safety devices. Processor 248 decodes and interprets the messages to determine the content of the messages, such as the locations of other passing vehicles, construction vehicles and workers as well as other traffic parameters. Processor 248 provides some or all of the message content to a human-machine driver 250, which generates human-machine interface 252 to convey some or all of the information in the message to a person in the vehicle.

Portable road sign 208, in accordance with one embodiment, is a hybrid DSRC-PCMS sign that can be moved to different positions along a road and includes a power source 265, roadside equipment (RSE) 260, a display controller 272 and a display 274. RSE 260 acts as a communication link that receives messages and rebroadcasts messages. RSE 260 includes an application processor 266, transceiver or radio 268, which in the embodiment of FIG. 2 takes the form of a DSRC radio, a position system 262, which in the embodiment of FIG. 2 takes the form of a GPS unit, a wireless modem 264 and a serial port 270. Processor 266 receives messages through radio 268. These messages can be received by radio 268 directly from Worker Safety Device 202 or moveable equipment 204 or through one or more intermediary vehicles such as moveable equipment 204, passing vehicle 206 or another RSE 260. Processor 266 rebroadcasts the received messages as well as decodes the received messages and uses the received messages to set information on the display 274. In particular, processor 266 accesses a memory 267 to retrieve an area or portion of the work zone that has been assigned to sign 208. This way, the area assigned to each sign can be extended because each sign can get the message from a remote worker even if that is not in its direct wireless access range. The sign, however, will make a decision to show a particular message, based upon how far the worker is from its own location. Processor 266 then compares the location of the workers in the messages it receives to the area of the work zone assigned to sign 208. If at least one worker is in the area assigned to the sign, processor 266 instructs display controller 272 to display a first speed limit. In addition, when at least one worker is in the area assigned to sign 208, processor 266 instructs display controller 272 to display a message indicating that workers are ahead. If no workers are in the area assigned to the sign, processor 266 instructs display controller 272 to display a second speed limit that is higher than the first speed limit. In further embodiments, processor 266 is able to determine if a worker is in a lane of traffic next to the work zone and in response instruct display controller 272 to display a STOP message.

Figure 3:
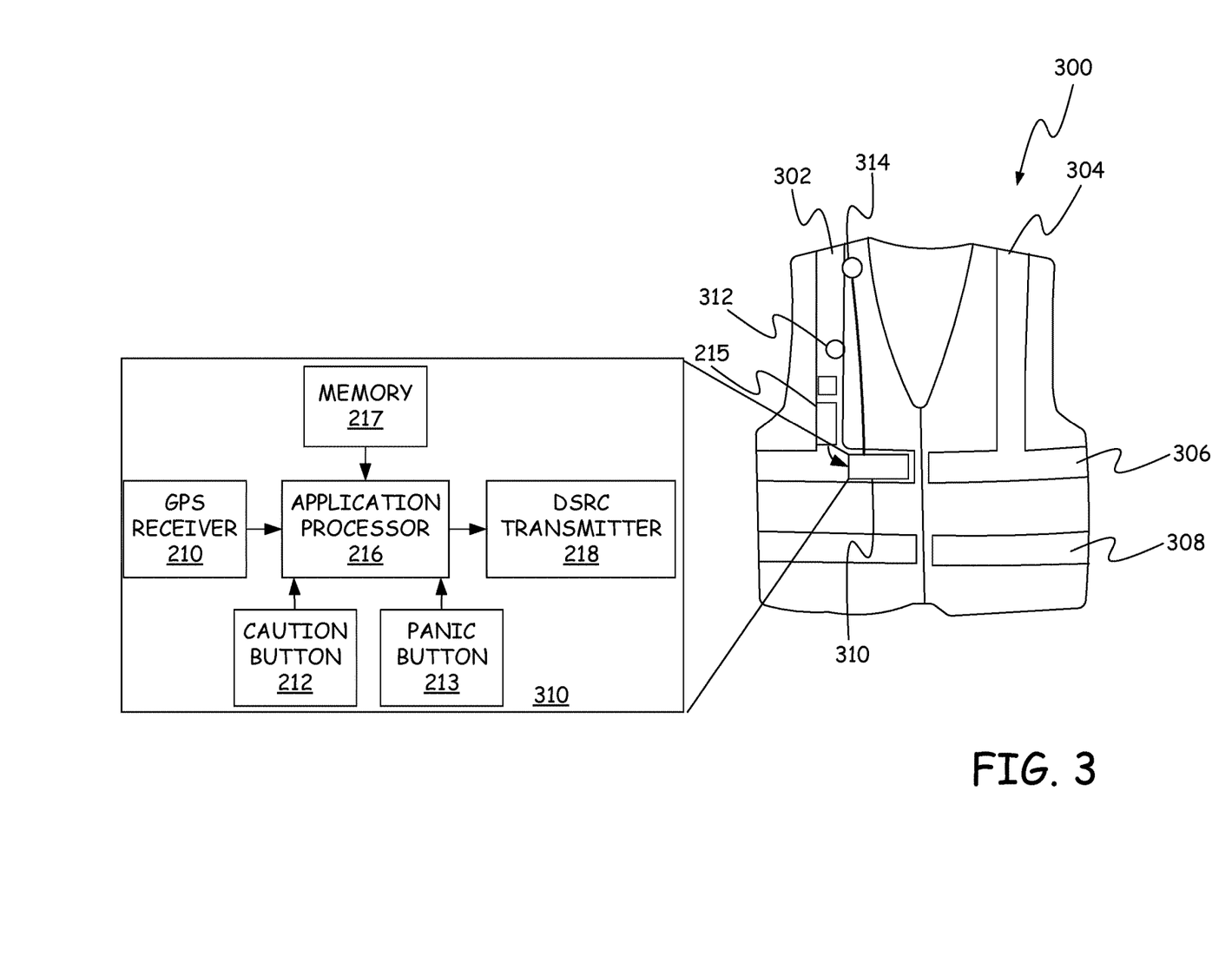
FIG. 3 is a diagram of a wearable safety device in accordance with one embodiment.

FIG. 3 provides an example of a wearable safety device 300 in the form of a safety vest. The safety vest includes reflective strips of material, such as reflective strips 302, 304, 306 and 308. An enclosure 310 houses GPS receiver 210, application processor 216, DSRC radio 218, caution button 212 and panic button 213. Power supply 215 is connected to the elements in enclosure 310 by one or more conductors and provides power to those elements. GPS antenna 314, which is connected to GPS receiver 210, and DSRC antenna 312, which is connected to DSRC radio 218 are positioned on the upper part of the safety vest. Alternatively, one or more of antennae 312 and 314 may be located within enclosure 310. The cables connecting the antennae 312 and 314 to enclosure 310 may be hidden behind reflective strip 302 in some embodiments.

DSRC radio 218 functions in a transmitter mode to periodically transmit safety messages at reasonable time intervals. Each safety message may contain the worker's position, an ID number corresponding to the workers safety device and panic or caution messages if panic button 213 or caution button 212 have been activated.

Ideally, power supply 215 will provide a minimum of 12 hours of power to cover an entire work shift of a worker. Further, power supply 215 should be of minimum size and weight.

Figure 4:
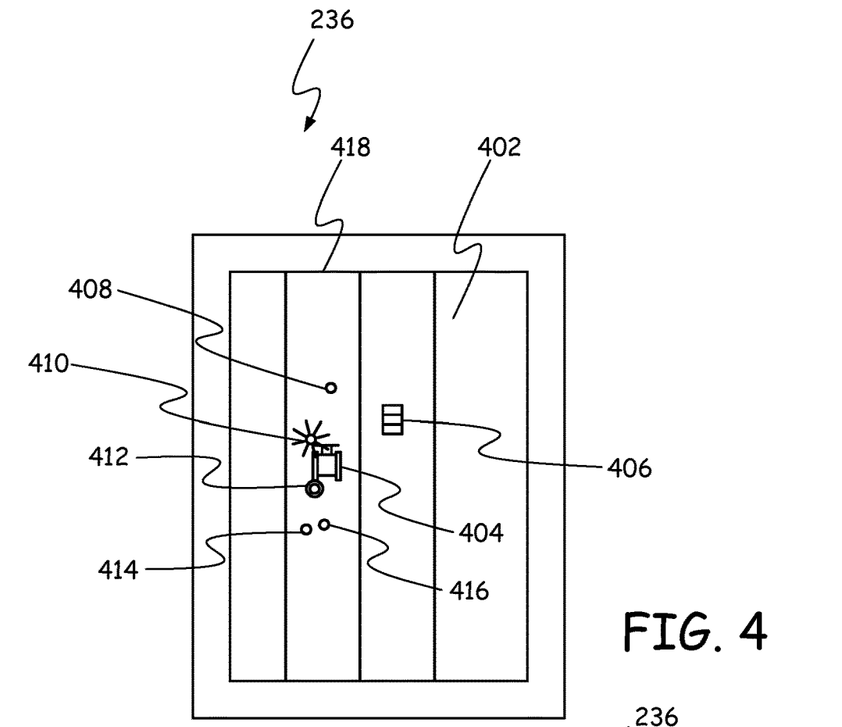
FIG. 4 shows an example user interface in accordance with some embodiments.

FIG. 4 provides an example of display device 236 having display 290. Display 290 displays a user interface 402 that shows a plurality of icons positioned on a rendering of a portion of a section of road. Icon 404 represents the construction vehicle that display device 236 is positioned within and icon 406 represents a vehicle passing a work zone. In addition, icons 408, 410, 412, 414 and 416 represent the position of workers relative to the construction vehicle. Icons 408, 414 and 416 are a standard icon for a worker, icon 412 represents a worker who has pressed a caution button on their wearable safety device and icon 410 is for a worker who has pressed the panic button on their worker safety device. After a worker has selected a caution button or a panic button, the worker's safety device will issue messages more often. As a result, the position of icons 410 and 412 is updated more often by onboard unit 220. Icons 410 and 412 differentiate the workers who have pressed the panic button or caution button to gain the attention of the driver of the construction vehicle. The rendering of the section of road may be a section of a map retrieved from a map provider and loaded into memory 297 with the map section being selected based on the position information for the construction vehicle.

Figure 5:
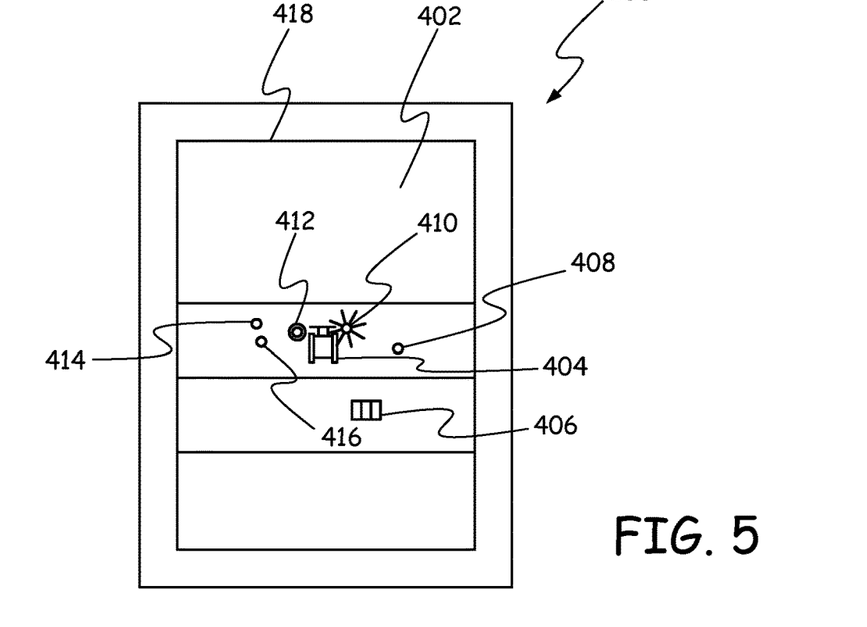
FIG. 5 shows the user interface of FIG. 4 after the moveable equipment has rotated ninety degrees.

In accordance with one embodiment, user interface 402 rotates with the orientation of the construction vehicle such that the front of vehicle icon 404 is always pointed to a top 418 of display 290. FIG. 5 provides an example of display device 236 after the construction vehicle associated with icon 404 has rotated ninety degrees to the left showing that the front of icon 404 continues to point to display top 418 but the other icons and the road section have been rotated ninety degrees to the right.

Figure 6:
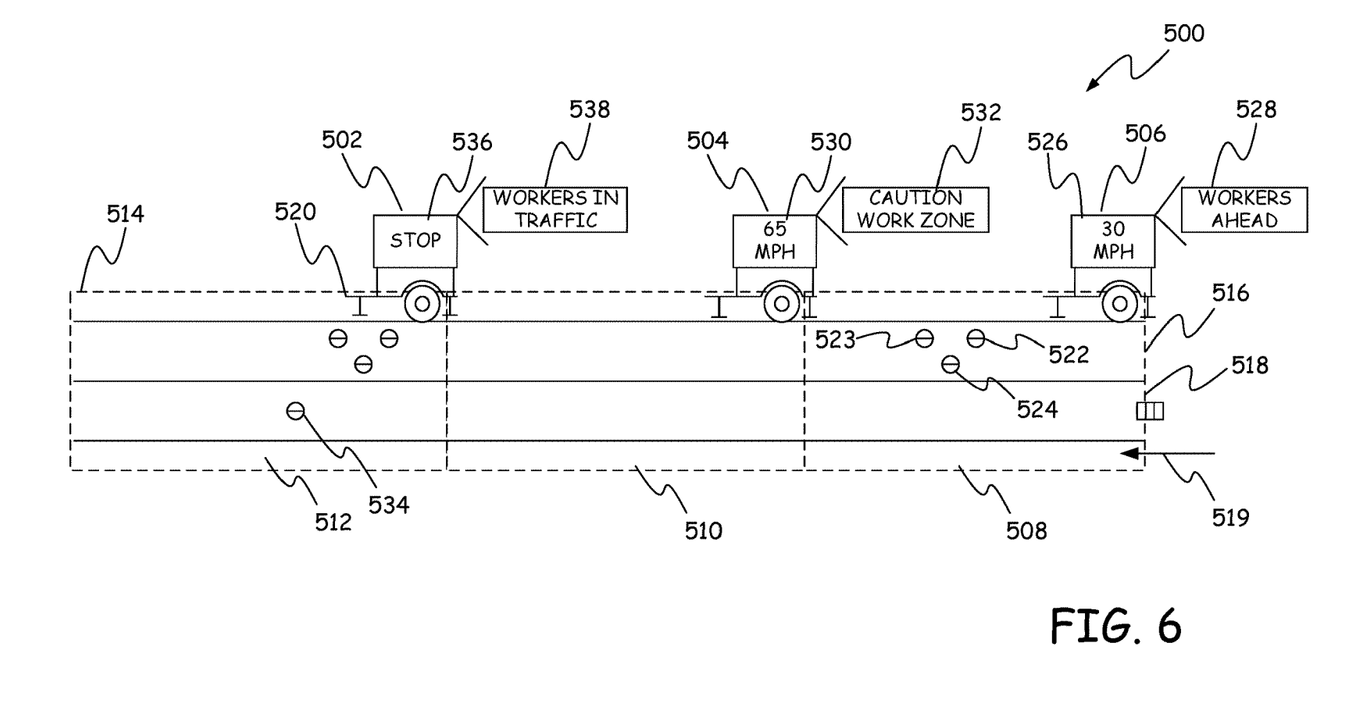
FIG. 6 is a plan view of a work zone showing signs with different speed limits.

FIG. 6 provides a plan view of a work zone 500 showing a collection of signs, such as signs 502, 504 and 506 that are distributed across work zone 500. Each sign has an assigned portion of the work zone. In particular, sign 506 has portion 508, which extends from sign 506 to sign 504. Sign 504 has portion 510, which extends from sign 504 to sign 502, and sign 502 has portion 512, which extends from sign 502 to an end 514 of work zone 500. Each portion extends across both a working lane 516 where construction work is being performed and a vehicle passing lane 518 where vehicles are passing the work zone in a direction 519.

Each of signs 502, 504 and 506 is a portable sign mounted on a trailer, such as trailer 520 for sign 502. Each sign is capable of displaying alternating messages with one message being a speed limit and the other message conveying additional information. The speed limit displayed on the signs is determined by the application processor 266 of the sign based on the presence of workers within the portion of the work zone assigned to the sign. For example, for sign 506, workers 522, 523 and 524 are in portion 508 and are in working lane 516. As a result, sign 506 alternately displays a lower speed limit 526 of 30 mph and an information sign 528 indicating that there are workers ahead.

Sign 504, on the other hand, determines that there are no workers in portion 510 of the work zone assigned to sign 504. As a result, sign 504 alternates between showing a higher speed limit 530 of 65 mph and an informational sign 532 that simply indicates the driver should use caution. Please note that the speed limits will have to comply the appropriate state laws. Sign 502 determines that there are workers in portion 512 of the work zone assigned to sign 502. In addition, sign 502 determines that one of the workers 534 is in passing lane 518 instead of working lane 516. As a result, sign 502 alternates between displaying a speed sign 536 that indicates that drivers should immediately stop and displaying a message sign 538 that indicates that a worker is in traffic. Thus, different signs within work zone 500 provide different speed limits depending on the position of workers relative to the portions of the work zone assigned to each sign.

We have designed an innovative safety system for roadside work zones which achieves at least two purposes: (i) provide visual guidance to a construction vehicle's operator via a monitor screen about the presence of the workers in close proximity, and (ii) alert passing traffic about the presence of the workers and posting variable speed limits depending upon the workers' presence. In the system, each worker will be wearing a miniaturized DSRC radio embedded in his safety vest, which will constantly broadcast the worker's GPS location to the DSRC radio installed on a nearby construction vehicle or a nearby DSRC equipped PCMS using DSRC based Vehicle-to-Vehicle (V2V) communication. The DSRC radio on the construction vehicle is connected with a display device (such as a mobile tablet or phone) that will show the real time position of workers to the operator to warn him or her if a worker is dangerously close to the construction vehicle. The system also helps improve the traffic mobility by dynamically changing the work zone speed limit posted on the PCMS depending on if the DSRC radio on the PCMS can detect workers present in the specific area of the work zone. We are using GPS to locate the workers and the vehicles rather than using sensors and instead of determining the absolute positions, we use the concept of relative GPS positioning which results in fairly high accuracy without using expensive equipment.

We use the concept of relative GPS accuracy which is a non-line-of-sight solution providing an acceptable precision level with a lower price range compared to highly accurate GPS devices. The safety system warns the construction vehicle operator using visual and sound alerts rather than individual workers who might miss the alerts due to noisy environment. The designed safety system is not incident/event driven, hence it provides continuous awareness of the surrounding work area. There are "panic" and "caution" features on the device worn by the worker which he or she can activate if in need of help or in a potentially dangerous position respectively.

Although the embodiments described above have been described with reference to a road work zone, the embodiments may be applied to other work sites such as building construction sites if GPS works there.

Although the present invention has been described with reference to preferred embodiments, workers skilled in the art will recognize that changes may be made in form and detail without departing from the spirit and scope of the invention.

What is claimed is:

1. A system comprising:
 a wireless communication system capable of receiving position information for a plurality of workers in a work zone and a message from a transmitter of a worker;
 a position system capable of providing position information for a piece of movable equipment in the work zone;
 a processor capable of determining positions of the plurality of workers relative to the position of the moveable equipment based on the position information for the plurality of workers and the position information for the movable equipment; and
 a display configured to display the positions of the plurality of workers relative to the position of the movable equipment and to indicate which worker's transmitter issued the message.

2. The system of claim 1 wherein the system is located in a cab of the movable equipment.

3. The system of claim 1 wherein the processor uses the position information for the plurality of workers and the position information for the movable equipment to remove errors common to the position information for the plurality of workers and the position information for the movable equipment.

4. The system of claim 3 wherein the position information for the plurality of workers comprises global positioning system information and the position information for the movable equipment comprises global positioning system information and wherein the processor removes errors common to the position information for the plurality of workers and the position information for the movable equipment by determining relative global positioning system information for the plurality of workers relative to the moveable equipment.

5. The system of claim 1 wherein the position information for the plurality of workers is received from respective transmitters in wearable safety devices worn by respective workers.

6. The system of claim 1 wherein the message comprises.

7. The system of claim 1 wherein the message comprises.

8. A system comprising:
 a plurality of signs distributed along a length of a road work zone, each sign assigned a portion of the road work zone and receiving information indicating whether at least one worker is currently in the sign's respective assigned portion, each sign displaying a first speed limit when at least one worker is in the sign's respective assigned portion and a second speed limit when no workers are in the sign's respective assigned portion wherein receiving information indicating whether at least one worker is currently in the sign's respective assigned portion comprises receiving position information originating from devices carried by each of a plurality of workers, the position information indicating a position of a respective worker and wherein the position information for a least one worker is relayed to the sign in part by a vehicle driving past the road work zone.

9. The system of claim 8 wherein the received position information for at least one worker indicates a position for the worker that is outside of the sign's assigned portion of the road work zone.

10. The system of claim 8 wherein the position information for at least one worker is further provided to a display system in a construction vehicle in the road work zone, the display system using the position information to display a position of the worker relative to the construction vehicle.

11. The system of claim 8 wherein each sign further indicates the presence of workers in the sign's respective portion of the road work zone when at least one worker is in the sign's respective assigned portion.

12. The system of claim 8 wherein at least one of the signs comprises a portable changeable message sign.

13. A construction vehicle comprising:
   a communication system that receives position information for a plurality of workers and a message from a device carried by one of the plurality of workers;
   a position system that determines a position of the construction vehicle;
   an application processor that determines the location of the plurality of workers relative to the construction vehicle; and
   a display that shows the location of the plurality of workers relative to the construction vehicle and which worker issued the message.

14. The construction vehicle of claim 13 wherein the communication system comprises a dedicated short range communication system that receives messages from cars passing the construction vehicle.

15. The construction vehicle of claim 13 wherein the position information comprises global positioning information and the position system provides global positioning information for the construction vehicle.

16. The construction vehicle of claim 15 wherein the application processor uses the global positioning information for the plurality of workers and the global positioning information for the construction vehicle to remove errors common to the global positioning information for the plurality of workers and the global positioning information for the construction vehicle.

17. The construction vehicle of claim 13 wherein the position information for each worker is generated by a respective device carried by the worker.

* * * * *

UNITED STATES PATENT AND TRADEMARK OFFICE
CERTIFICATE OF CORRECTION

PATENT NO. : 10,567,910 B2
APPLICATION NO. : 15/340509
DATED : February 18, 2020
INVENTOR(S) : M. Imran Hayee, Nazanin Abbaszadeh Banaeiyan and Attiq Uz Zaman It is certified that error appears in the above-identified patent and that said Letters Patent is hereby corrected as shown below:

In the Claims

Column 8, Line 48, Claim 6, please delete "6. The system of claim 1 where the message comprises."
And insert --6. The system of claim 1 wherein the message comprises a panic message.--

Column 8, Line 49, Claim 7, please delete "7. The system of claim 1 where the message comprises."
And insert --7. The system of claim 1 wherein the message comprises a caution message.--

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*